(12) United States Patent
Deshmukh et al.

(10) Patent No.: US 10,063,504 B1
(45) Date of Patent: Aug. 28, 2018

(54) SYSTEMS AND METHODS FOR SELECTIVELY ARCHIVING ELECTRONIC MESSAGES

(71) Applicant: Veritas Technologies LLC, Mountain View, CA (US)

(72) Inventors: Amar Deshmukh, Maharashtra (IN); Hrishikesh R. Desai, Maharashtra (IN)

(73) Assignee: Veritas Technologies LLC, Mountain View, CA (US)

(*) Notice: Subject to any disclaimer, the term of this patent is extended or adjusted under 35 U.S.C. 154(b) by 152 days.

(21) Appl. No.: 14/859,383

(22) Filed: Sep. 21, 2015

(51) Int. Cl.
    *G06F 17/30* (2006.01)
    *H04L 12/58* (2006.01)
    *G06Q 10/10* (2012.01)

(52) U.S. Cl.
    CPC .............. *H04L 51/12* (2013.01); *H04L 51/22* (2013.01); *G06Q 10/107* (2013.01); *H04L 51/26* (2013.01)

(58) Field of Classification Search
    CPC ........ H04L 51/22; H04L 51/26; G06F 10/107
    USPC .................................. 709/206; 707/613, 713
    See application file for complete search history.

(56) References Cited

U.S. PATENT DOCUMENTS

| | | | | |
|---|---|---|---|---|
| 6,522,727 | B1* | 2/2003 | Jones | H04M 3/533 379/88.18 |
| 6,678,705 | B1* | 1/2004 | Berchtold | G06F 17/30011 |
| 6,769,016 | B2* | 7/2004 | Rothwell | H04L 51/12 706/20 |
| 8,161,122 | B2* | 4/2012 | Sood | H04L 51/26 709/206 |
| 8,341,105 | B1* | 12/2012 | Gartside | G06N 5/025 706/47 |
| 8,380,675 | B1* | 2/2013 | Dwivedi | G06Q 10/107 707/661 |
| 2001/0014909 | A1* | 8/2001 | Yoshida | G06Q 10/107 709/206 |
| 2004/0237109 | A1* | 11/2004 | Laitinen | H04L 29/06 725/62 |
| 2005/0086307 | A1* | 4/2005 | Kelley | H04L 51/26 709/206 |

(Continued)

FOREIGN PATENT DOCUMENTS

EP          1509014 A2 *    2/2005    ............. H04L 12/58

*Primary Examiner* — Frantz Coby
(74) *Attorney, Agent, or Firm* — FisherBroyles LLP

(57) ABSTRACT

The disclosed computer-implemented method for selectively archiving electronic messages may include (1) monitoring, at a messaging account of a user, interactions between the user and messages received at the messaging account, (2) identifying message characteristics that are indicative of unimportant messages to the user by (A) identifying, based on the interactions between the user and the received messages, received messages that are unimportant to the user and (B) identifying characteristics of the unimportant received messages, (3) receiving an incoming message at the messaging account, (4) determining, based on a comparison between at least one characteristic of the incoming message and the message characteristics that are indicative of unimportant messages, that the incoming message is unimportant to the user, and (5) archiving the incoming message based on the determination that the incoming message is unimportant to the user. Various other methods, systems, and computer-readable media are also disclosed.

20 Claims, 6 Drawing Sheets

(56) References Cited

U.S. PATENT DOCUMENTS

| | | | |
|---|---|---|---|
| 2005/0198169 A1* | 9/2005 | Holten | G06Q 10/107 709/206 |
| 2005/0204001 A1* | 9/2005 | Stein | G06Q 10/107 709/206 |
| 2006/0031357 A1* | 2/2006 | Misra | H04L 51/22 709/206 |
| 2006/0123084 A1* | 6/2006 | Heidloff | G06Q 10/107 709/206 |
| 2006/0206569 A1* | 9/2006 | Heidloff | H04L 51/22 709/206 |
| 2008/0126951 A1* | 5/2008 | Sood | G06Q 10/107 715/752 |
| 2008/0141372 A1* | 6/2008 | Massey | H04L 63/123 726/23 |
| 2010/0036813 A1* | 2/2010 | Cameron | G06Q 10/107 707/726 |

* cited by examiner

SYSTEMS AND METHODS FOR SELECTIVELY ARCHIVING ELECTRONIC MESSAGES

BACKGROUND

Users of electronic messaging accounts may sometimes receive large numbers of unnecessary and/or unimportant messages. For example, users may receive unwanted advertisements, forwarded chains of emails, and/or automated messages from distribution lists. These messages may clog up messaging accounts and make identifying helpful and/or important messages difficult or tedious. To help reduce extraneous messages in users' inboxes, some messaging services may implement archiving tools that transfer certain messages from inboxes to secure and/or remote storage locations.

Unfortunately, traditional archiving technologies may be unable to efficiently and/or accurately identify and transfer messages that are unimportant or infrequently accessed by users. In one example, a conventional archiving system may simply archive messages after they have been in an inbox for a certain period of time. In another example, an archiving system may only begin archiving messages after an inbox has reached a certain quota of messages. As a result, some messages that are important to users may be archived, while some messages that are unimportant may remain in a user's inbox. The instant disclosure, therefore, identifies and addresses improved systems and methods for selectively archiving electronic messages.

SUMMARY

As will be described in greater detail below, the instant disclosure describes various systems and methods for selectively archiving electronic messages by monitoring interactions between a user and messages received at the user's messaging account, analyzing the received messages and the monitored interactions to identify message characteristics that indicate what kinds of messages are unimportant to the user, and then determining whether to archive incoming messages based on whether the incoming messages contain characteristics that indicate the messages are unimportant.

In one example, a computer-implemented method for selectively archiving electronic messages may include (1) monitoring, at a messaging account of a user, interactions between the user and messages received at the messaging account, (2) identifying message characteristics that are indicative of unimportant messages to the user by (A) identifying, based on the interactions between the user and the received messages, received messages that are unimportant to the user and (B) identifying characteristics of the unimportant received messages, (3) receiving an incoming message at the messaging account, (4) determining, based on a comparison between at least one characteristic of the incoming message and the message characteristics that are indicative of unimportant messages, that the incoming message is unimportant to the user, and (5) archiving the incoming message based on the determination that the incoming message is unimportant to the user.

In some examples, monitoring the interactions between the user and the messages received at the messaging account may include determining that the user has not performed any action on at least one received message within a predetermined amount of time. Additionally or alternatively, monitoring the interactions between the user and the received messages may include identifying actions performed by the user on the received messages. The actions performed on the received messages may include deleting a message, archiving a message, opening a message, replying to a message, and/or labelling a message. In some embodiments, the method may further include identifying an amount of time between a message being received at the messaging account and the user performing an action on the message.

In some examples, identifying the characteristics of the unimportant received messages may include identifying a sender of a message, an additional recipient of a message, a subject of a message, and/or a topic of a message. In some embodiments, determining that the incoming message is unimportant to the user may include determining that the incoming message exhibits at least a threshold number of message characteristics that are indicative of unimportant messages. Furthermore, in some examples, archiving the incoming message may include archiving the incoming message immediately upon receiving the incoming message at the messaging account without displaying the incoming message to the user.

In some embodiments, the method may further include receiving an additional incoming message at the messaging account. The method may then include determining, based on a comparison between at least one characteristic of the incoming message and at least one characteristic of the additional incoming message, that the additional incoming message is more important to the user than the incoming message. In response to that determination, the method may include storing the additional incoming message in a faster access location than the archived incoming message.

In one embodiment, a system for implementing the above-described method may include (1) a monitoring module that monitors, at a messaging account of a user, interactions between the user and messages received at the messaging account, (2) an identification module that identifies message characteristics that are indicative of unimportant messages to the user by (A) identifying, based on the interactions between the user and the received messages, received messages that are unimportant to the user and (B) identifying characteristics of the unimportant received messages, (3) a reception module that receives an incoming message at the messaging account, (4) a determination module that determines, based on a comparison between at least one characteristic of the incoming message and the message characteristics that are indicative of unimportant messages, that the incoming message is unimportant to the user, and (5) an archiving module that archives the incoming message based on the determination that the incoming message is unimportant to the user. In addition, the system may include at least one physical processor configured to execute the monitoring module, the identification module, the reception module, the determination module, and the archiving module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, at a messaging account of a user, interactions between the user and messages received at the messaging account, (2) identify message characteristics that are indicative of unimportant messages to the user by (A) identifying, based on the interactions between the user and the received messages, received messages that are unimportant to the user and (B) identifying characteristics of the unimportant received messages, (3) receive an incoming message at the messaging account, (4) determine, based on a comparison between at least one characteristic of the incoming message and the message characteristics that are indicative of unimportant messages, that the incoming message is unimportant to the user, and (5) archive the incoming message based on the determination that the incoming message is unimportant to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
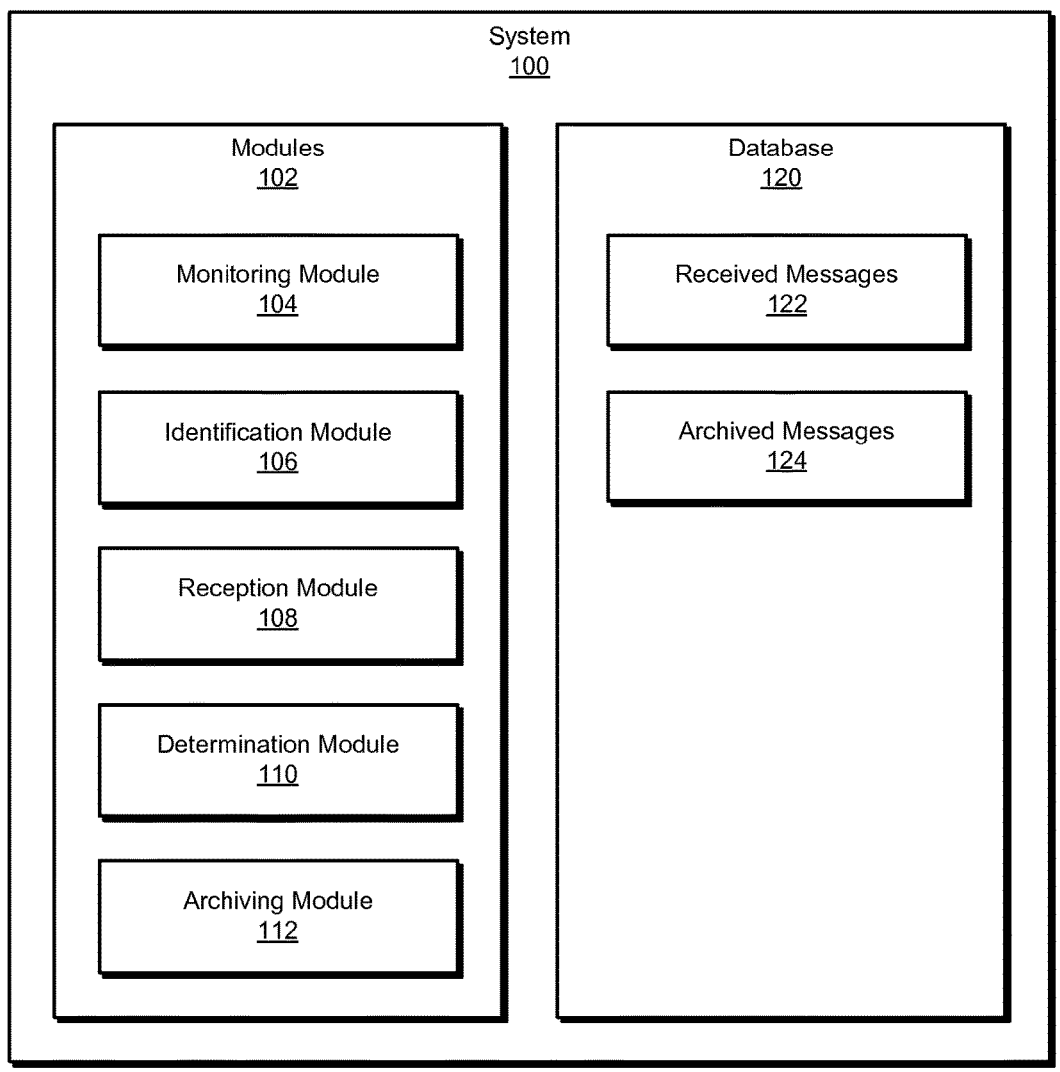
FIG. 1 is a block diagram of an exemplary system for selectively archiving electronic messages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for selectively archiving electronic messages. As will be explained in greater detail below, by comparing the characteristics of an incoming message to message characteristics that are indicative of messages a user finds unimportant, the disclosed systems and methods may determine whether the incoming message is important or unimportant to the user. As such, the disclosed systems and methods may archive messages that are likely unimportant or infrequently accessed by a user while ensuring that important or frequently accessed messages remain in the user's inbox.

Figure 2:
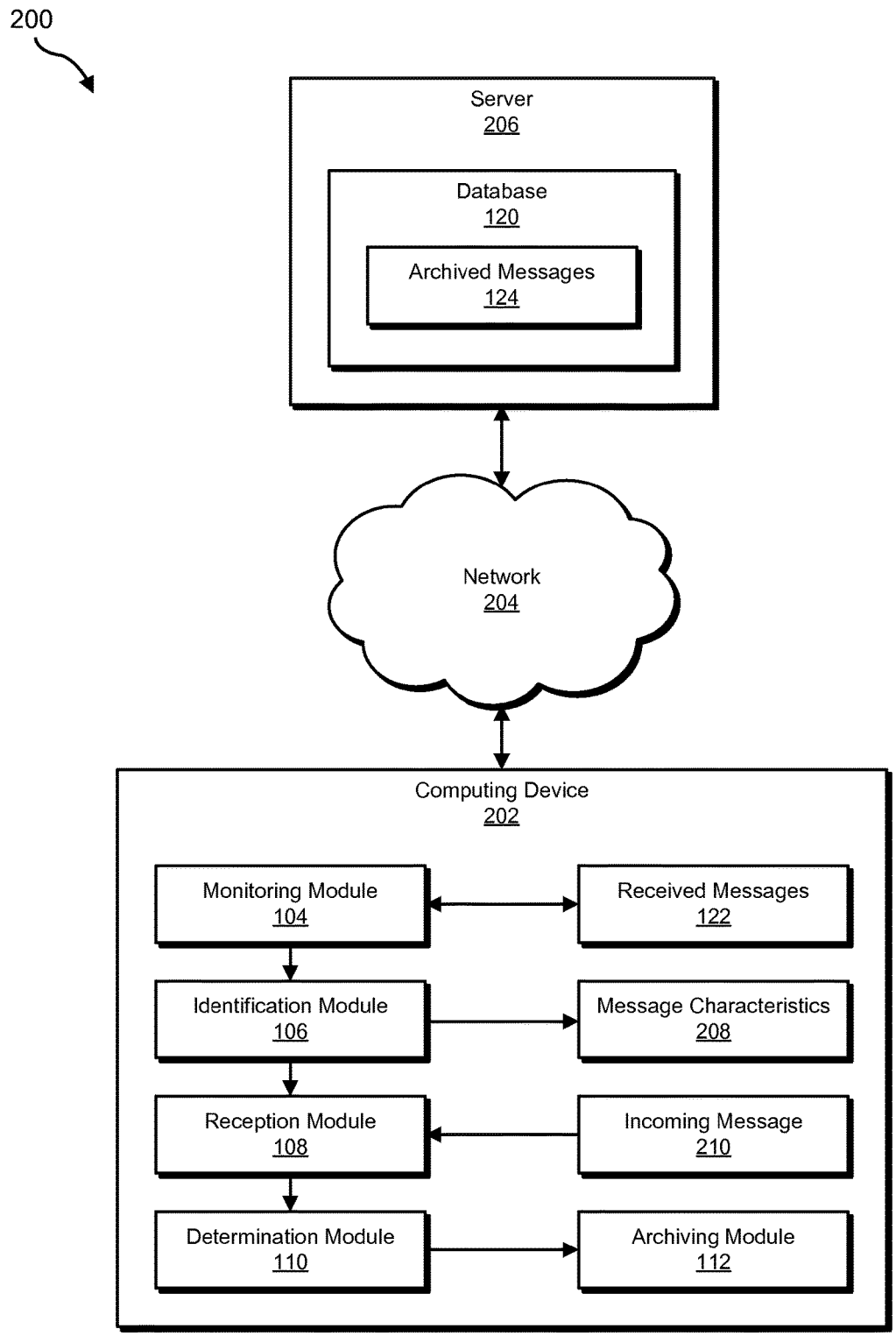
FIG. 2 is a block diagram of an additional exemplary system for selectively archiving electronic messages.
Figure 3:
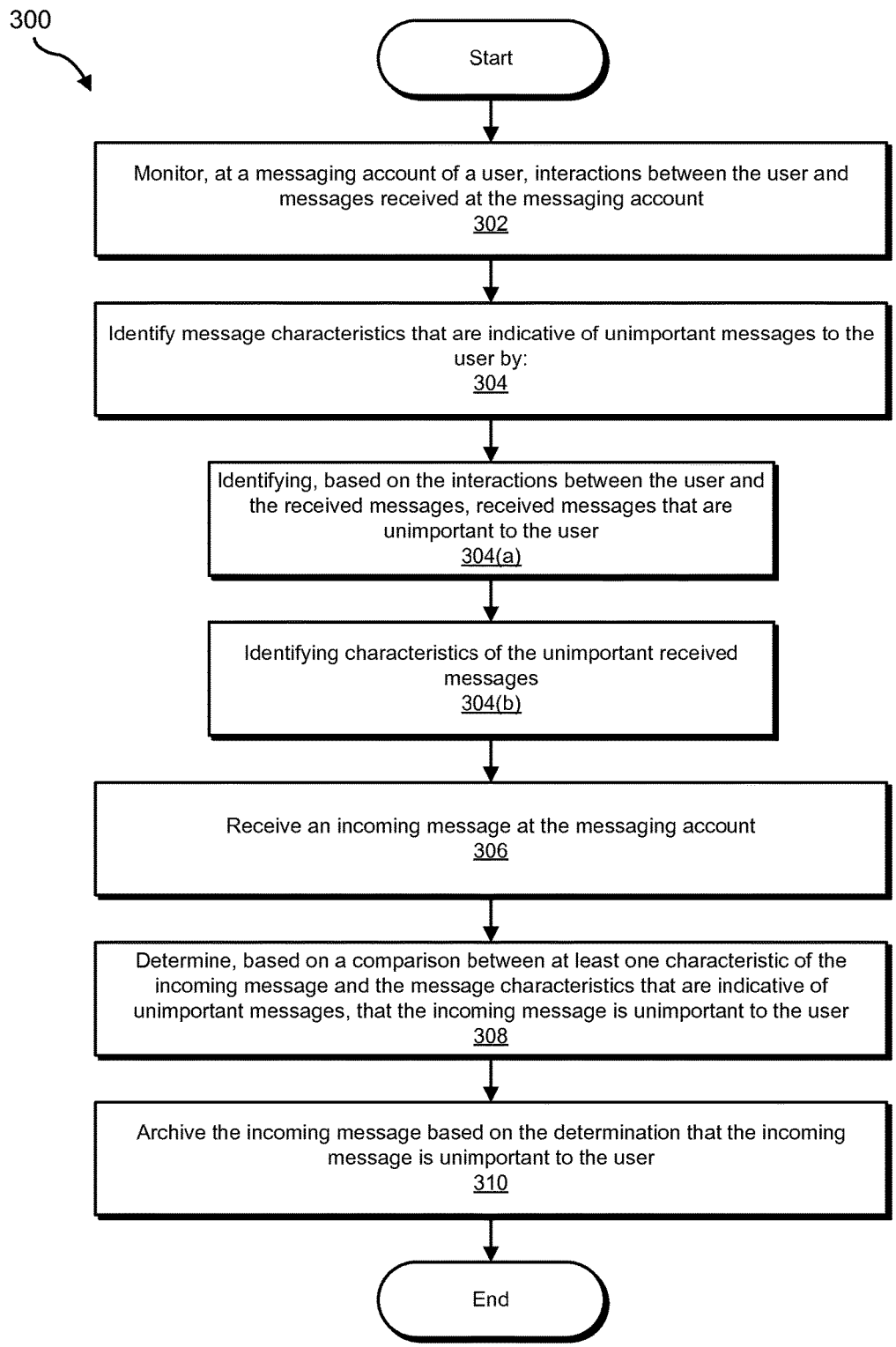
FIG. 3 is a flow diagram of an exemplary method for selectively archiving electronic messages.
Figure 4:
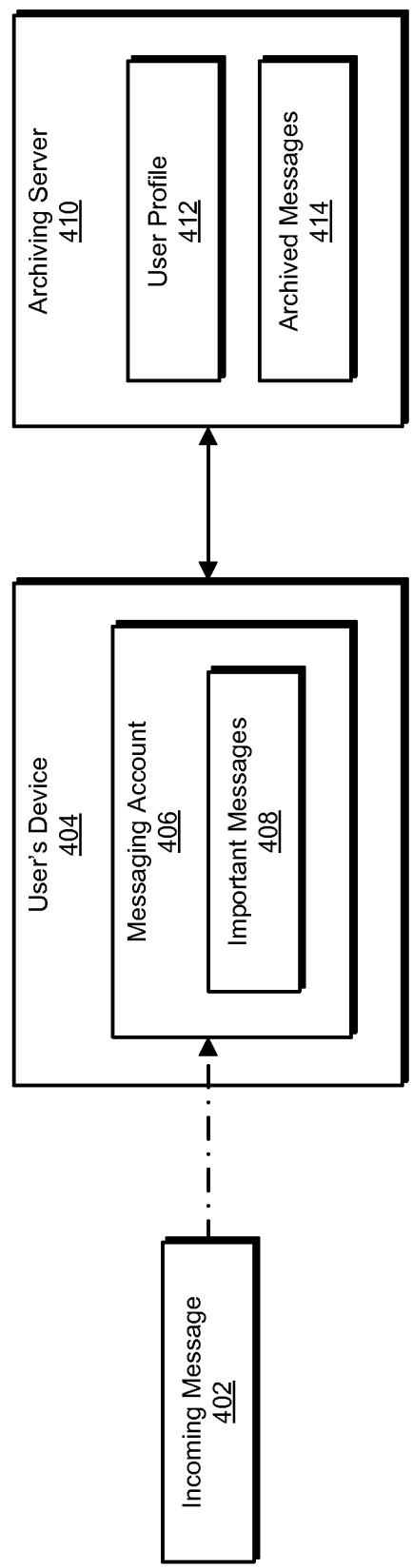
FIG. 4 is a block diagram of an additional exemplary system for selectively archiving electronic messages.

The following will provide, with reference to FIGS. 1, 2, and 4, detailed descriptions of exemplary systems for selectively archiving electronic messages. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for selectively archiving electronic messages. As illustrated in this figure, exemplary system 100 may include one or more modules 102 for performing one or more tasks. For example, and as will be explained in greater detail below, exemplary system 100 may include a monitoring module 104 that monitors, at a messaging account of a user, interactions between the user and messages received at the messaging account. Exemplary system 100 may also include an identification module 106 that identifies message characteristics that are indicative of unimportant messages to the user by (1) identifying, based on the interactions between the user and the received messages, received messages that are unimportant to the user and (2) identifying characteristics of the unimportant received messages.

In addition, and as will be described in greater detail below, exemplary system 100 may include a reception module 108 that receives an incoming message at the messaging account. Exemplary system 100 may also include a determination module 110 that determines, based on a comparison between at least one characteristic of the incoming message and the message characteristics that are indicative of unimportant messages, that the incoming message is unimportant to the user. Finally, exemplary system 100 may include an archiving module 112 that archives the incoming message based on the determination that the incoming message is unimportant to the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

In one example, database 120 may be configured to store all or a portion of the electronic messages associated with one or more messaging accounts. For example, database 120 may store received messages 122, which may include any message received at a messaging account of a user. Additionally or alternatively, database 120 may store archived messages 124, which may include any message that has been selected to be archived by an archiving system or the user of the messaging account. In some examples, received messages 122 may include all or a portion of archived messages 124.

The term "archived message," as used herein, generally refers to any message that has been transferred or copied to a specified storage location from an initial storage location (e.g., an inbox) within a messaging account. In some examples, the specified storage location may represent a secure and/or slow-access storage location (e.g., compared to the storage location that contains messages currently within a user's inbox). Moreover, users and/or traditional archiving systems may choose to archive a message based on a factors such as determining that the message is older than a certain threshold and/or determining that an inbox of a messaging account has filled an available amount of storage space.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In an exemplary embodiment, modules 102 may represent an archiving system that selectively archives messages received at a user's messaging account. In the example of FIG. 2, computing device 202 may represent a user's computing device that operates all or a portion of modules 102 as an archiving system within a messaging account of the user. In this example, modules 102 on computing device 202 may be in communication with server 206 in order to analyze and/or archive messages received at the messaging account.

In one embodiment, one or more of modules 102 from FIG. 1 may, when executed by at least one processor of computing device 202 and/or server 206, enable computing device 202 and/or server 206 to selectively archive electronic messages. For example, and as will be described in greater detail below, monitoring module 104 may cause computing device 202 and/or server 206 to monitor, at a messaging account of a user, interactions between the user and received messages 122. In addition, identification module 106 may cause computing device 202 and/or server 206 to identify message characteristics 208 that are indicative of unimportant messages to the user by (1) identifying, based on the interactions between the user and received messages 122, which of received messages 122 are unimportant to the user and (2) identifying characteristics of the received messages 122 that are unimportant to the user. Next, reception module 108 may cause computing device 202 and/or server 206 to receive an incoming message 210 at the messaging account. Determination module 110 may then cause computing device 202 and/or server 206 to determine, based on a comparison between at least one characteristic of incoming message 210 and message characteristics 208, that incoming message 210 is unimportant to the user. Finally, archiving module 112 may cause computing device 202 and/or server 206 to archive incoming message 210 based on the determination that incoming message 210 is unimportant to the user.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of receiving, storing, analyzing, and/or archiving messages received at a messaging account. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for selectively archiving electronic messages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may monitor, at a messaging account of a user, interactions between the user and messages received at the messaging account. For example, monitoring module 104 may, as part of computing device 202 in FIG. 2, monitor, at a messaging account of a user, interactions between the user and received messages 122.

The term "messaging account," as used herein, generally refers to any type or form of online service, database, or profile that manages and organizes electronic messages distributed or received by a user. A messaging account may manage any type or form of electronic message, including emails, Short Message Service (SMS) messages, and/or instant messages. In some examples, a messaging account may group, label, or categorize messages based on certain properties of the messages and/or in response to input from a user.

The systems described herein may monitor a messaging account of a user in a variety of ways. In some examples, monitoring module 104 may be integrated into and/or directly control a user's messaging account in order to monitor messages received at the messaging account. Additionally or alternatively, monitoring module 104 may monitor a messaging account from a remote server or other computing device.

In some embodiments, monitoring module 104 may identify each action that a user performs on messages received at a messaging account. For example, monitoring module 104 may detect and record each time a user opens and/or reads a message, replies to a message, forwards a message, deletes a message, searches for a message, and/or manually selects to save or archive a message. In addition, monitoring module 104 may detect and record when a user categorizes or classifies a message, such as by labelling a message as "important" or "high priority," or moving a message to a folder created by the user. Furthermore, monitoring module 104 may track patterns of actions performed on a message and/or periods of time between multiple actions performed on a message.

In some examples, monitoring module 104 may determine that a user has not performed any actions on one or more received messages. For example, monitoring module 104 may determine that a message has remained unopened in a user's inbox since the message was first received. Similarly, monitoring module 104 may determine that a user has not performed any actions on one or more messages in a certain period of time. For example, monitoring module 104 may determine that a user opened a message a few days, weeks, or months ago but has not yet replied to or deleted the message.

Returning to FIG. 3, at step 304 one or more of the systems described herein may identify message characteristics that are indicative of unimportant messages to the user by (1) identifying, based on the interactions between the user and the received messages, received messages that are unimportant to the user (step 304(*a*)) and (2) identifying characteristics of the unimportant received messages (step 304(*b*)). For example, identification module 106 may, as part of computing device 202 in FIG. 2, identify message characteristics 208 by (1) identifying, based on the interactions between the user and received messages 122, which of received messages 122 are unimportant to the user and (2) identifying characteristics of the received messages 122 that are unimportant to the user.

The term "unimportant message," as used herein, generally refers to any message that a user does not or is not likely to access frequently and/or that is not relevant or a helpful to a user. Examples of messages that may be unimportant include, without limitation, spam messages, messages created using distribution lists, messages within long chains of forwarded/replied-to messages, messages with many recipients, messages accidentally sent to a user, automatically generated messages, combinations of one or more of the same, variations of one or more of the same, and/or any additional type of potentially unimportant message. Conversely, the term "important message," as used herein, generally refers to any message that a user accesses frequently and/or that may be relevant, helpful, and/or necessary to a user.

The systems described herein may determine that a message is unimportant in a variety of ways. In some examples, identification module 106 may determine that particular actions and/or periods of inactivity regarding a message indicate that a message is unimportant. For example, identification module 106 may determine that any message a user deletes or archives before reading is unimportant. In addition, identification module 106 may determine that any message a user deletes or archives after reading but before forwarding or replying to is unimportant. Furthermore, identification module 106 may determine that a message that has not been accessed (e.g., replied to, forwarded, opened, or searched for) within a certain period of time (e.g., 1 month, 2 months, etc.) is unimportant. Conversely, identification module 106 may determine that any message that a user has accessed (e.g., ever or within a certain period of time) and/or any message that a user has labelled or categorized (e.g., by flagging the message as important or moving the message to a user-generated folder) is important.

Furthermore, in some examples, identification module 106 may determine whether a message is important or unimportant based on one or more characteristics of the message. The term "characteristic," as used herein, generally refers to any type or form of property, feature, or detail contained within and/or exhibited by a message. Examples of message characteristics include, without limitation, a sender of a message, additional recipients of a message, a subject or header of a message, a topic of content of a message, attachments within a message, a format of a message, keywords within a message, a user-generated label or category of a message, and/or any additional type of characteristic. Identification module 106 may identify characteristics of messages in any suitable way, such as by searching for text in predetermined locations of messages (e.g., to identify the content of sender or subject fields), comparing messages to signatures that describe certain message characteristics, and/or parsing content of messages to identify message topics.

In some examples, identification module 106 may identify characteristics of a message after determining that the message is unimportant to the user. In other examples, identification module 106 may identify characteristics of a message before determining whether the message is important unimportant (e.g., in response to receiving the message at a messaging account and/or detecting an interaction between a user and the message). In these examples, identification module 106 may use characteristics of the message to help determine the importance of the message. For example, identification module 106 may determine that a message is unimportant based at least in part on the message having been automatically generated and sent to a user. In another example, identification module 106 may determine that a message is important based at least in part on the message containing certain keywords (such as "sensitive" or "urgent").

Moreover, in some embodiments, identification module 106 may determine whether a message is important or unimportant based at least in part on its relationship to other messages. For example, identification module 106 may determine that the latest message in a chain of messages may be important, while previously-read messages within the chain are unimportant. In some examples, identification module 106 may determine whether a message is important or unimportant based on a combined analysis of the interactions between a user and the message, the content or characteristics of the message, and/or relationships between the message and additional messages.

After identifying messages that are unimportant to the user, identification module 106 may record characteristics of the unimportant messages to help identify future messages that are likely to be unimportant to the user. For example, identification module 106 may determine that if at least a predetermined number of messages sent from a certain individual or organization are unimportant to a user, then subsequent messages from the same individual or organization are likely to be unimportant as well. As such, identification module 106 may record the sender of the unimportant messages as a message characteristic that is indicative of unimportant messages. In another example, identification module 106 may determine that a messaging containing an advertisement for a certain product is unimportant to the user and therefore record the type of advertisement as an unimportant message characteristic.

Returning to FIG. 3, at step 306 one or more of the systems described herein may receive an incoming message at the messaging account. For example, reception module 108 may, as part of computing device 202 in FIG. 2, receive an incoming message 210 at the messaging account.

The systems described herein may receive an incoming message in a variety of ways. In some examples, reception module 108 may identify an incoming message and forward the message to determination module 110 so that determination module 110 may determine whether to archive the message. In some embodiments, reception module 108 may wait to forward incoming messages to determination module 110 until after identification module 106 has identified at least a certain number of message characteristics that are indicative of unimportant messages (e.g., in order to ensure that incoming messages may be accurately classified as important or not important). In other embodiments, reception module 108 may be integrated into an email client (e.g., as an add-in or extension) or service and may identify an incoming message when the messages arrives at the email client.

Returning to FIG. 3, at step 308 one or more of the systems described herein may determine, based on a comparison between at least one characteristic of the incoming message and the message characteristics that are indicative of unimportant messages, that the incoming message is unimportant to the user. For example, determination module 110 may, as part of computing device 202 in FIG. 2, determine, based on a comparison between at least one characteristic of incoming message 210 and message characteristics 208, that incoming message 210 is unimportant to the user.

The systems described herein may determine that an incoming message is unimportant to a user in a variety of ways. In some examples, determination module 110 may determine that an incoming message is unimportant based on determining that the incoming message exhibits at least a certain number or percentage of unimportant message characteristics. In other examples, determination module 110 may determine that an incoming message is unimportant based on the type of unimportant message characteristics found within the incoming message. As an example, the systems described herein may determine that a messaging account is associated with three unimportant message characteristics: messages sent from a particular sender, messages that have over five recipients, and messages containing advertisements. In this example, determination module 110 may determine that any incoming message from the particular sender (regardless of other characteristics of the incoming message) is unimportant. However, if the sender of an incoming message is not the particular sender, determination module 110 may only determine that the incoming message is unimportant in the event that the message both has over five recipients and is an advertisement.

In additional examples, determination module 110 may determine that one or more incoming messages are important to a user. For example, determination module 110 may determine that an incoming message is from a sender that frequently communicates with the user, that an incoming message contains certain keywords indicating the message contains urgent or sensitive information, and/or that the topic of the incoming message is a topic the user is known to find important. In response to determining that a message is important to a user, determination module 110 may determine that the message should not be archived (i.e., that the message should be displayed within a user's inbox).

Returning to FIG. 3, at step 310 one or more of the systems described herein may archive the incoming message based on the determination that the incoming message is unimportant to the user. For example, archiving module 112 may, as part of computing device 202 in FIG. 2, archive incoming message 210 based on the determination that incoming message 210 is unimportant to the user.

The systems described herein may archive a message in a variety of ways. In some examples, archiving module 112 may archive a message by removing the message from its original storage location and storing the message in a separate storage location. In one example, the separate storage location may be a separate physical or virtual storage device that may securely store the message (e.g., so that the message may not be inadvertently deleted). In addition, the separate storage device may more efficiently store a message (e.g., use less storage space and/or fewer computing resources) but may result in a slower access time to retrieve the message.

Additionally, in some examples, archiving module 112 may remove a visual identification of an archived message from within a user interface of a messaging account. For example, archiving module 112 may delete a link or shortcut within an inbox that provides a user access to a message after the message has been archived. In some embodiments, archiving module 112 may create a link or shortcut to access the message in another location, such as a folder that contains archived messages.

In some examples, archiving module 112 may archive a message based on its degree of importance to a user. For example, archiving module 112 may determine that one message is more important than another message based on a comparison between the number and/or types of unimportant message characteristics exhibited by the messages. Accordingly, archiving module 112 may store the less important message in a slower-access location than the more important message. As such, the systems described herein may prioritize faster access storage space for messages that a user is more likely to access in the future.

In some embodiments, archiving module 112 may archive an incoming message immediately upon the arrival of the message at a messaging account. For example, the systems described herein may determine that the incoming message is unimportant to the user and archive the message before the message is displayed to the user (e.g., within an inbox of the messaging account). In this way, the systems described herein may streamline and/or simplify a user's inbox by preventing unwanted messages from taking up space in the inbox.

However, in other embodiments, the systems described herein may monitor and/or analyze a message after the message is received at a messaging account before determining whether to archive the message. For example, in the event that a message does not contain any characteristics that confirm whether the message is important or unimportant, monitoring module 104 may attempt to determine the importance of the message based on the user's interactions with the message over a period of time. In one example, archiving module 112 may archive a message in the event that monitoring module 104 determines that a user has ignored (i.e., not interacted with) a message after a certain amount of time. In another example, archiving module 112 may wait to archive a message that is part of a message chain until after a subsequent message in the message has arrived at the messaging account.

As explained above, one or more of modules 102 may be implemented as an archiving system within a user's messaging account. In some examples, modules 102 may operate in conjunction with a messaging account and a backend server or database. FIG. 4 illustrates an exemplary embodiment of such a configuration. In the example of FIG. 4, modules 102 may monitor messages received at a messaging account 406 running on a user's device 404. In this example, modules 102 may also operate and/or be in communication with an archiving server 410. Archiving server 410 may identify and record characteristics of messages received at messaging account 406 and interactions between a user of user's device 404 and the received messages. Based on an analysis of the identified characteristics and interactions, archiving server 410 may generate a user profile 412 that identifies message characteristics that are indicative of unimportant messages to the user.

When an incoming message (such as incoming message 402) is received at messaging account 406, modules 102 may use user profile 412 to determine whether the incoming message is important or unimportant to the user. In one example, modules 102 may determine that incoming message 402 is important to the user. As such, modules 102 may direct incoming message 402 to important messages 408 (e.g., an inbox of messaging account 406). In another example, modules 102 may determine that incoming message 402 is unimportant to the user. In this example, modules 102 may store incoming message 402 within archived messages 414 in archiving server 410.

As explained above in connection with method 300, the systems described herein may monitor actions performed by a user on messages received at the user's messaging account to determine types of messages that are unimportant to a user and/or that a user infrequently accesses. Then, the systems described herein may extract characteristics of the unimportant messages to create a profile for the user that describes characteristics of unimportant messages. When a new message is received at the messaging account, the systems described herein may compare characteristics of the new message with the user's profile to determine whether the message is important or unimportant to the user. In the event that the message is unimportant, the systems described herein may archive the message instead of displaying the message in an inbox of the messaging account.

Figure 5:
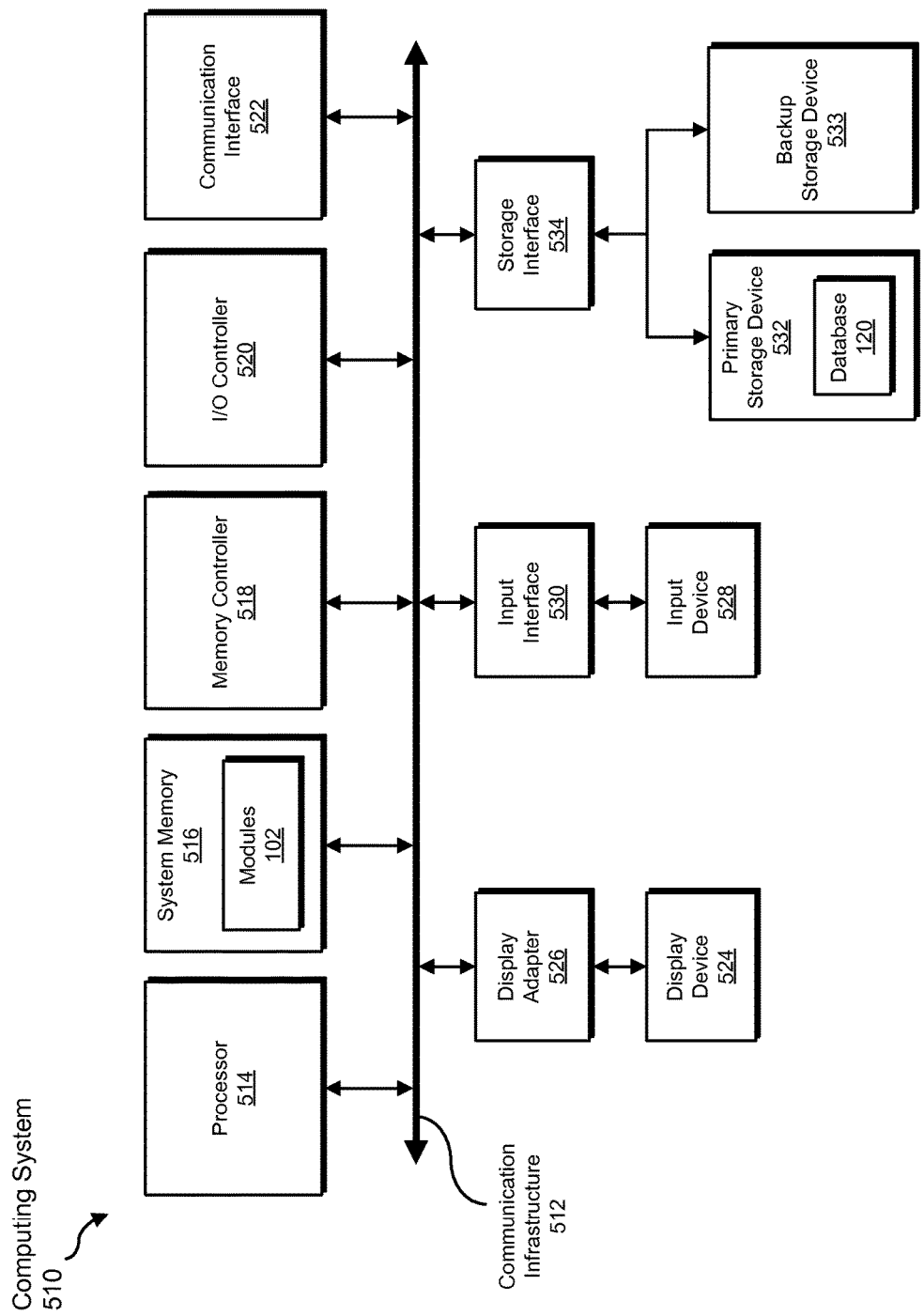
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
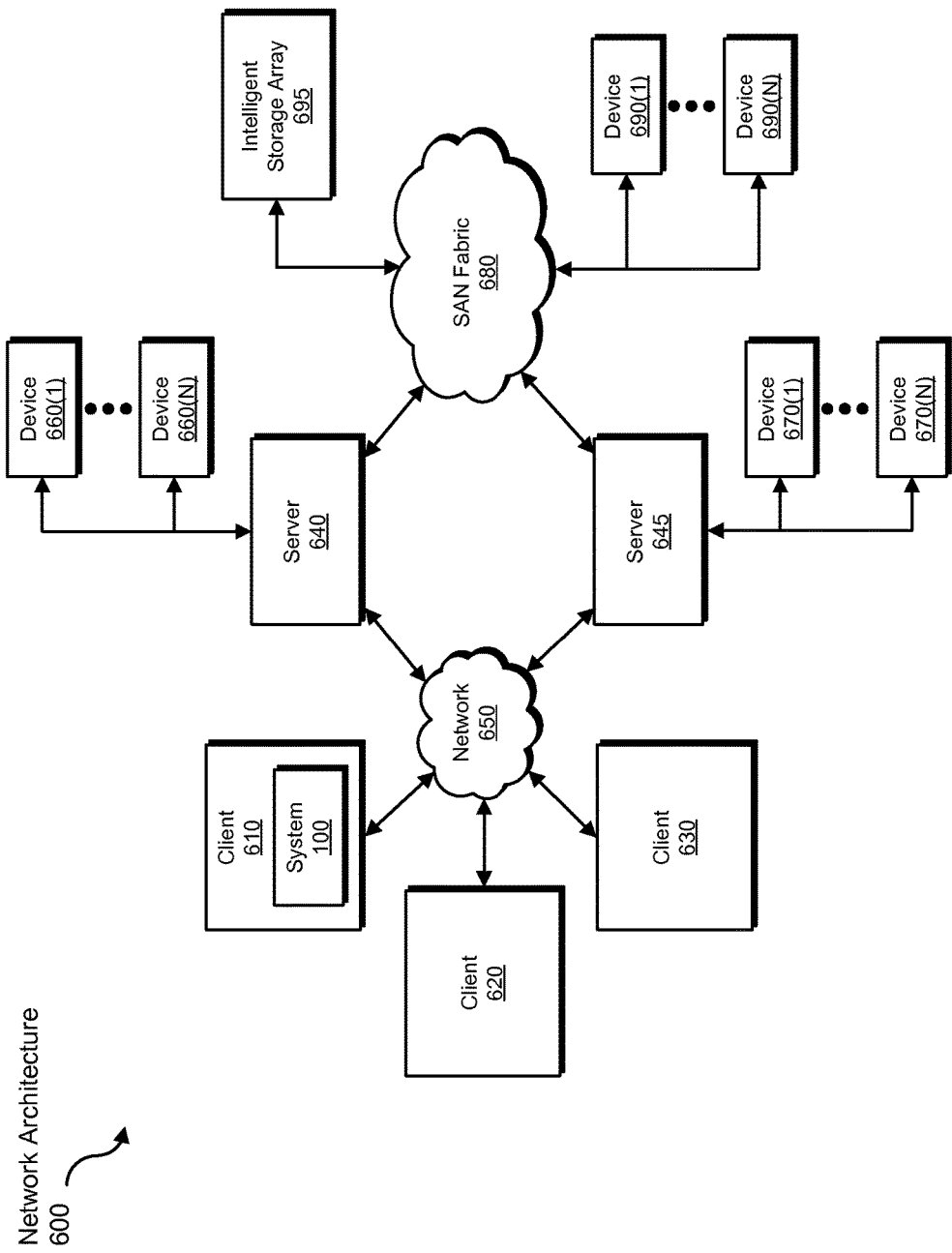
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for selectively archiving electronic messages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive, at a messaging account of a user, messages to be transformed, transform the messages into characteristics that are indicative of unimportant messages to the user, output a result of the transformation to the messaging account, use the result of the transformation to archive unimportant messages, and store the result of the transformation to a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selectively archiving electronic messages, at least a portion of the method being performed by a computing device comprising at least one processor, the method comprising:
    monitoring, at a messaging account of a user, interactions between the user and messages received at the messaging account;
    identifying message characteristics that are indicative of unimportant messages to the user by:
        identifying, based on the interactions between the user and the received messages, messages that the user has manually selected to archive;
        determining, based on the user selecting to archive the messages, that the messages are unimportant to the user; and
        identifying characteristics of the messages the user selected to archive;
    receiving an incoming message at the messaging account;
    before the incoming message reaches an inbox of the messaging account:
        determining, based on a comparison between at least one characteristic of the incoming message and the message characteristics that are indicative of unimportant messages, that the incoming message is unimportant to the user; and
        in response to the determination that the incoming message is unimportant to the user, directly archiving the incoming message instead of displaying, to the user, an indication of the message within the inbox of the messaging account.

2. The method of claim 1, wherein monitoring the interactions between the user and the messages received at the messaging account comprises identifying actions performed by the user on the received messages.

3. The method of claim 2, wherein the actions performed on the received messages comprise at least one of:
    deleting a message;
    opening a message;
    archiving a message;
    replying to a message; and
    labelling a message.

4. The method of claim 2, wherein identifying the message characteristics that are indicative of unimportant messages further comprises identifying an amount of time between a message being received at the messaging account and the user performing an action on the message.

5. The method of claim 1, wherein monitoring the interactions between the user and the messages received at the messaging account comprises determining that the user has not performed any action on at least one received message within a predetermined amount of time.

6. The method of claim 1, wherein identifying the characteristics of the messages the user selected to archive comprises identifying at least one of:
   a sender of a message;
   an additional recipient of a message;
   a subject of a message; and
   a topic of a message.

7. The method of claim 1, wherein determining that the incoming message is unimportant to the user comprises determining that the incoming message exhibits at least a threshold number of message characteristics that are indicative of unimportant messages.

8. The method of claim 1, further comprising:
   receiving an additional incoming message at the messaging account;
   determining, based on a comparison between at least one characteristic of the incoming message and at least one characteristic of the additional incoming message, that the additional incoming message is more important to the user than the incoming message; and
   in response to determining that the additional incoming message is more important, storing the additional incoming message in a faster access location than the archived incoming message.

9. The method of claim 1, further comprising:
   identifying at least one message that the user has manually selected to archive before reading; and
   determining, based on the user selecting to archive the message before reading the message, that the message is unimportant to the user.

10. The method of claim 1, further comprising:
    identifying at least one message that:
       the user has manually selected to archive after reading; and
       the user has not replied to before archiving; and
    determining, in response to both the user selecting to archive the message after reading the message and the user not replying to the message before archiving the message, that the message is unimportant to the user.

11. A system for selectively archiving electronic messages, the system comprising:
    a monitoring module, stored in memory, that monitors, at a messaging account of a user, interactions between the user and messages received at the messaging account;
    an identification module, stored in memory, that identifies message characteristics that are indicative of unimportant messages to the user by:
       identifying, based on the interactions between the user and the received messages, messages that the user has manually selected to archive;
       determining, based on the user selecting to archive the messages, that the messages are unimportant to the user; and
       identifying characteristics of the messages the user selected to archive;
    a reception module, stored in memory, that receives an incoming message at the messaging account;
    a determination module, stored in memory, that determines, before the incoming message reaches an inbox of the messaging account, based on a comparison between at least one characteristic of the incoming message and the message characteristics that are indicative of unimportant messages, that the incoming message is unimportant to the user;
    an archiving module, stored in memory, that directly archives, in response to the determination that the incoming message is unimportant to the user, the incoming message instead of displaying, to the user, an indication of the message within the inbox of the messaging account; and
    at least one processor configured to execute the monitoring module, the identification module, the reception module, the determination module, and the archiving module.

12. The system of claim 11, wherein the monitoring module monitors the interactions between the user and the messages received at the messaging account by identifying actions performed by the user on the received messages.

13. The system of claim 12, wherein the actions performed on the received messages comprise at least one of:
    deleting a message;
    opening a message;
    archiving a message;
    replying to a message; and
    labelling a message.

14. The system of claim 12, wherein the identification module further identifies the message characteristics that are indicative of unimportant messages by identifying an amount of time between a message being received at the messaging account and the user performing an action on the message.

15. The system of claim 11, wherein the monitoring module monitors the interactions between the user and the messages received at the messaging account by determining that the user has not performed any action on at least one received message within a predetermined amount of time.

16. The system of claim 11, wherein the identification module identifies the characteristics of the messages the user selected to archive by identifying at least one of:
    a sender of a message;
    an additional recipient of a message;
    a subject of a message; and
    a topic of a message.

17. The system of claim 11, wherein the determination module determines that the incoming message is unimportant to the user by determining that the incoming message exhibits at least a threshold number of message characteristics that are indicative of unimportant messages.

18. The system of claim 11, wherein:
    the reception module receives an additional incoming message at the messaging account;
    the determination module determines, based on a comparison between at least one characteristic of the incoming message and at least one characteristic of the additional incoming message, that the additional incoming message is more important to the user than the incoming message; and
    in response to the determination that the additional incoming message is more important, the archiving module stores the additional incoming message in a faster access location than the archived incoming message.

19. A non-transitory computer-readable medium comprising one or more computer-readable instructions that, when executed by at least one processor of a computing device, cause the computing device to:
- monitor, at a messaging account of a user, interactions between the user and messages received at the messaging account;
- identify message characteristics that are indicative of unimportant messages to the user by:
  - identifying, based on the interactions between the user and the received messages, messages that the user has manually selected to archive;
  - determining, based on the user selecting to archive the messages, that the messages are unimportant to the user; and
  - identifying characteristics of the messages the user selected to archive;
- receive an incoming message at the messaging account;
- before the incoming message reaches an inbox of the messaging account:
  - determine, based on a comparison between at least one characteristic of the incoming message and the message characteristics that are indicative of unimportant messages, that the incoming message is unimportant to the user; and
  - directly archive, in response to the determination that the incoming message is unimportant to the user, the incoming message instead of displaying, to the user, an indication of the message within the inbox of the messaging account.

20. The non-transitory computer-readable medium of claim 19, wherein the one or more computer-readable instructions cause the computing device to monitor the interactions between the user and the messages received at the messaging account by identifying actions performed by the user on the received messages.

* * * * *